United States Patent Office 3,517,233
Patented June 23, 1970

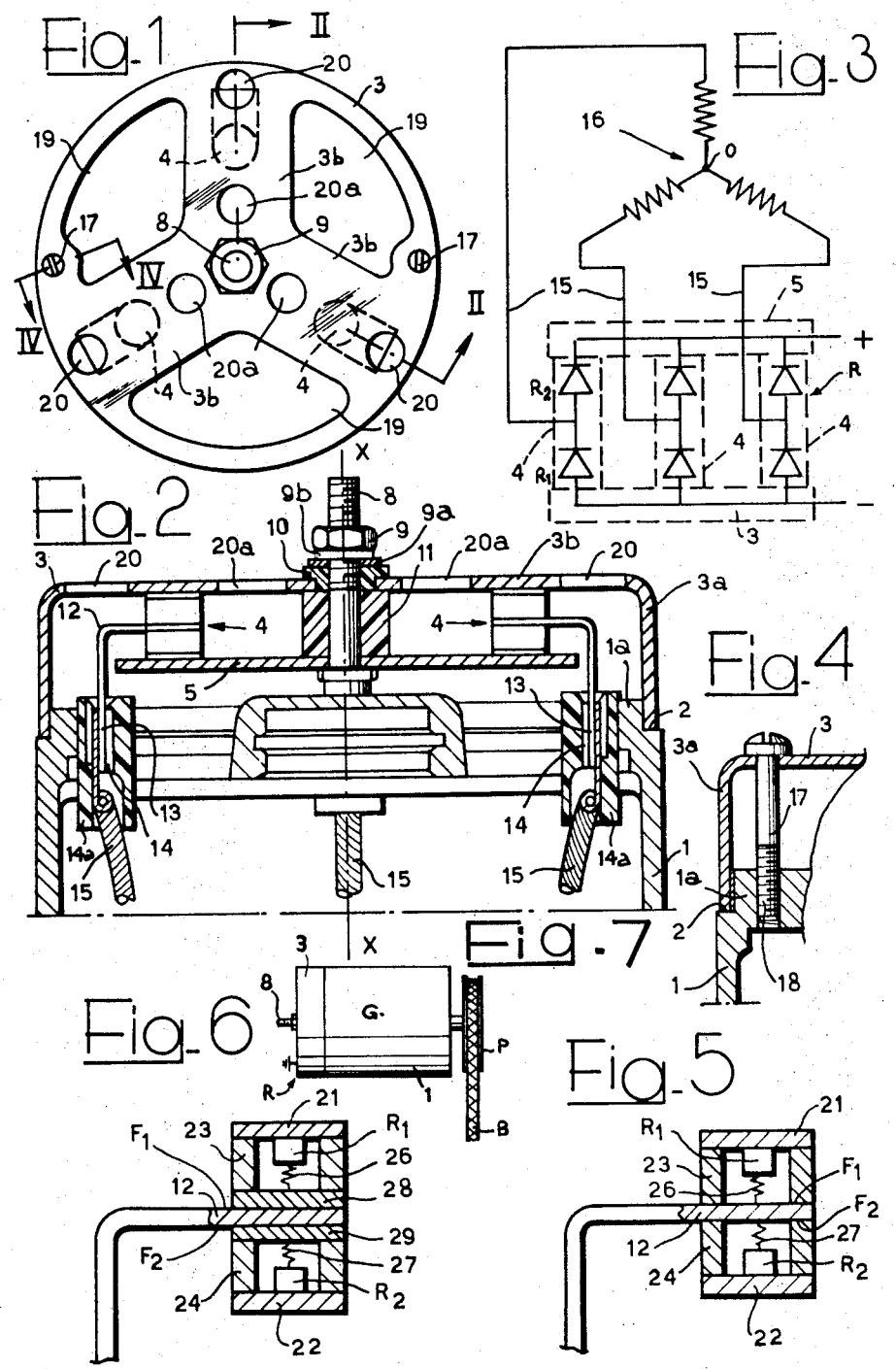

3,517,233
ALTERNATING CURRENT GENERATOR
Rinaldo Margaira, Turin, Italy, assignor to FIAT Società per Azioni, Turin, Italy
Filed Feb. 2, 1968, Ser. No. 702,671
Claims priority, application Italy, Feb. 7, 1967, 50,467/67
Int. Cl. H02k 11/00
U.S. Cl. 310—68                   11 Claims

ABSTRACT OF THE DISCLOSURE

An alternating current generator for a motor vehicle has a demountable rectifier unit comprising respective rectifier modules clamped between a cover plate and a support plate at one end of the stator casing, connector elements connecting each respective module to a stator phase winding, and the rectifier modules being hermetically sealed.

---

This invention relates to rectifier units for alternating current generators, more particularly electrical generators for motor vehicles.

It is known to provide an alternating current generator for a motor vehicle with a rectifier unit arranged to rectify the alternating current output of the generator. The rectifier unit has, however, been prone to damage, and replacement and checking of the unit is, generally speaking, difficult.

An object of the present invention is to provide, for mounting on an alternating current generator of a motor vehicle, a rectifier unit which is accessible and is capable of easy removal for replacement or testing. A further object is to provide in such a generator rectifier unit having a small number of components which are effectively sealed to give protection against mechanical stress and against corrosive agents in the atmosphere.

According to the invention there is provided, in combination with an alternating current generator for a motor vehicle, said generator having a stator casing and a plurality of stator windings, an improved detachable rectifier unit comprising: a cover member mounted on one end of the stator casing; a support member spaced inwardly of the cover member; a plurality of rectifier modules, one for each stator phase, clamped between the support member and the cover member; respective releasable connector elements connecting each respective rectifier module with a respective stator phase winding; and output means connected to the rectifier unit for receiving rectified current from the generator.

Preferably each rectifier module comprises a pair of series-connected semiconductor diodes, each respective connector element being connected to the junction between the pair of diodes of the respective rectifier module.

The use of screws, clamps or like electrical connections is avoided in the rectifier unit.

The rectifier unit preferably includes respective cases hermetically enclosing the respective rectifier modules.

In a preferred embodiment the stator phase windings are connected to respective sockets, the respective connector elements comprising respective plug members which are releasably connected to respective said sockets.

Preferably the cover member is apertured to provide cooling air access to the interior of the cover member.

The invention will be further understood by reference to the following description, given by way of example, with reference to the accompanying drawings, wherein:

FIG. 1 is an end view of a motor vehicle generator provided with a rectifier unit according to one embodiment of the invention;

FIG. 2 is a cross sectional view taken on line II—II of FIG. 1;

FIG. 3 is a circuit diagram of the rectifier unit as connected to a three-phase motor vehicle generator;

FIG. 4 is a cross sectional view taken on line IV—IV of FIG. 1;

FIG. 5 is an axial cross section through a rectifier module forming part of the rectifier unit;

FIG. 6 is an axial cross section of a modfied form of the said rectifier module, and FIG. 7 is a diagrammatic side elevation of a generator fitted with the rectifier unit.

FIG. 7 shows an alternating current generator G for mounting on a motor vehicle internal combustion engine (not shown) to be driven thereby. The generator G is a conventional three-phase generator having a stator (not shown) enclosed within a cylindrical stator casing 1 and a rotor (not shown) mounted rotatably within the stator.

Drive is transmitted to the generator from the vehicle engine by a flexible drive belt B acting on a pulley P mounted on the rotor at one end of the casing 1.

The generator stator has three respective phase windings, represented diagrammatically at 16 in the circuit of FIG. 3, each connected at one end to a common junction point O at its other end to a respective phase lead 15.

The three-phase alternating current output of the generator G in the leads 15 is rectified by a rectifier unit R comprising three rectifier modules 4, one for each phase of the generator output, connected as a full-wave rectifier bridge, as shown in FIG. 3.

Each rectifier module 4 comprises a pair of semi-conductor diodes $R_1$, $R_2$ connected together in series with the positive pole of one diode connected to the negative pole of the other, and the respective phase lead 15 being connected to the junction between the two diodes. The other respective poles of the diodes $R_1$, $R_2$ are connected to respective positive and negative direct current output conductors, common to the three rectifier modules 4.

According to the present invention the rectifier unit R is mounted detachably at the end of the stator casing 1 (FIG. 7) remote from the pulley P. For this purpose the casing 1 has an end portion 1a of reduced diameter (FIG. 4) defining an annular shoulder 2 on which an integral cylindrical skirt 3a of the pressed sheet metal cover 3 is received concentrically. The cover 3 is detachably secured to the end portion 1a by means of two screws 17 (FIGS. 1 and 4) which engage in tapped holes 18 in the end portion 1a.

The cover 3 has three equal sector-shaped apertures 19 therein which define between them respective arms 3b which extend radially with respect to the axis X—X of the generator G. A sheet metal support plate 5 is spaced inwardly of the cover 3 and has the shape of a three branched star, the arms of which are axially aligned with the arms 3b of the cover 3. The three rectifier modules 4 are clamped between the three respective axially aligned parts of the cover 3 and the support plate 5, as shown in FIGS. 1 and 2.

The support plate 5 is secured to the cover 3 by a central axially extending bolt 8 passing through an insulating sleeve 11, the clamping of the modules 4 between the cover 3 and the support plate 5 being effected by a nut 9 threaded on the outer end of the bolt 8 and acting through a spring washer 9b and a metal washer 9a on an insulating bush 10 engaging the outer surface of the cover 3. The bush 10 projects through a central hole in the cover 3 and abuts the outer end of the sleeve 11, so that the bush 10 and sleeve 11 serve both to insulate and to space the support plate 5 from the cover 3.

The support plate 5 and the cover 3 respectively constitute the positive and negative direct current output conductors, as indicated by the broken outlines in FIG. 3. The cover 3 and the housing 1 are connected to a vehicle earth, and the bolt 8 constitutes a positive output terminal. It will be appreciated that for vehicles of the type having a "positive earth," the polarities of the diode rectifiers $R_1$, $R_2$ of the rectifier modules 4 would be reversed so that the bolt 8 would then constitute a negative output terminal.

The phase leads 15 of the generator G are connected to respective axially extending sockets 14 spaced equiangularly around the axis X—X in the end portion 1a of the generator casing 1, each socket 14 being insulated from the casing 1 by a respective insulating bushing 14a. The pair of rectifier diodes $R_1$, $R_2$ constituting each respective module 4 are interconnected through a metal strip 12 (FIG. 2). Each strip 12 extends radially outwardly and is bent at right angles to form an axially extending plug member 13 adapted to fit into a respective said socket 14 to effect a releasable electrical connection to the respective phase lead 15.

The plug and socket connections between the rectifier modules 4 and the phase leads 15 facilitate removal of the rectifier unit R for inspection and/or replacement; it is merely necessary to release the screws 17 holding the cover 3, the entire rectifier unit R being attached to the cover 3 by the bolt 8.

One of the rectifier modules 4 is shown in section in FIG. 5. The two semiconductor diodes $R_1$, $R_2$ are secured to respective metal end plates 21, 22 to which respective glass insulating rings 23, 24 are bonded by fusion. The adjacent ends of the glass rings 23, 24 are fusion-bonded to opposite faces $F_1$, $F_2$ of the respective connector strip 12 to form an hermetically sealed case enclosing the rectifier diodes $R_1$, $R_2$. The diodes $R_1$, $R_2$ are secured to the internal faces of the plates 21, 22 in order to assist the dissipation of the considerable quantity of heat generated in the diodes $R_1$, $R_2$ in operation of the rectifier unit. The diodes $R_1$, $R_2$ are connected to the connector strip 12 by respective spring contacts 26, 27 of known type. When the module 4 is clamped between the cover 3 and the support plate 5 the plates 21, 22 contact the cover 3 and the support plate 5 respectively.

FIG. 6 shows a modified form of rectifier module 4, where the same reference numerals have been used to indicate like parts. The glass rings 23, 24 in this modification do not make direct contact with the connector strip 12, but are closed sealingly at their ends facing towards the strip 12 by respective plates 28, 29 which are welded to the opposite respective faces of the strip.

In both FIGS. 5 and 6 the rectifier diodes $R_1$, $R_2$ are effectively sealed against atmospheric contamination and the glass rings 23, 24 also serve to protect the diodes $R_1$, $R_2$ against mechanical stresses.

The cover 3 is formed with cooling holes 20, 20a in each radial arm 3b, the centres of the holes 20, 20a being aligned radially with the centre of the respective rectifier module 4 attached to the inner surface of the respective arm 3b, and being located radially outwardly and inwardly respectively of the respective module 4. The holes 20, 20a, together with the apertures 19, permit a cooling air circulation for cooling the cover 3, the support plate 5, the rectifier modules 4 and the generator G.

I claim:

1. In combination with an alternating current generator for a motor vehicle, said generator having a stator casing and a plurality of stator windings, the improvement which comprises a detachable rectifier unit comprising: a conductive cover member mounted on one end of the stator casing; a star-shaped, conductive support member spaced inwardly of the cover member; a conductive coupling member passing through the center of said star-shaped, conductive support in electrical contact with said support and extending through the center of said cover but electrically insulated therefrom; a plurality of rectifier modules, one for each stator phase, and clamped between the support member and the cover member on respective arms of said support member; respective releasable connector elements carried by said stator, internally thereof, and connecting each respective rectifier module with a respective stator phase winding; whereby, said stator and said single conductive member extending outwardly through said cover constitute output means connected to the rectifier unit for receiving rectified current from the generator.

2. A rectifier unit as claimed in claim 1 wherein each rectifier module comprises a pair of series-connected semiconductor diodes, each respective connector element being connected to the junction between the pair of diodes of the respective rectifier module.

3. A rectifier unit as claimed in claim 1 including respective sockets on the generator to which the respective stator phase windings are connected, the respective connector elements comprising respective plug members which are releasably connected to respective said sockets.

4. A rectifier unit as claimed in claim 1 including respective cases hermetically enclosing the respective rectifier modules.

5. A rectifier unit as claimed in claim 2 wherein the pair of diodes of each rectifier module is hermetically enclosed in a respective case having conductive end walls electrically connected to opposite poles of the respective diodes, the support member and the cover member clamping the respective rectifier module between said respective end walls, and each said case having insulating walls which insulate said end walls from each other.

6. A rectifier unit as claimed in claim 5 wherein each connector element includes a conductive strip which interconnects the two diodes of the respective rectifier module, said insulating walls being sealed to opposite faces of the strip.

7. A rectifier unit as claimed in claim 6 wherein the insulating walls of each rectifier module are constituted by two vitreous rings hermetically sealed at their outer ends to the support member and the cover member respectively and at their inner ends to opposite respective faces of the conductive strip.

8. A rectifier unit as claimed in claim 7 including respective metal plates interposed between the respective vitreous rings and the respective faces of the conductive strip.

9. A rectifier unit as claimed in claim 5 wherein a respective diode of each respective rectifier module is secured to the internal face of a respective said end wall of the module connected to one of the releasable connector elements each connecting a respective rectifier module with a respective stator phase winding.

10. A rectifier unit as claimed in claim 1 including releasable screws demountably attaching the cover member to the generator stator.

11. A rectifier unit as claimed in claim 1 wherein the cover member is apertured to provide cooling air access to the interior of the cover member.

References Cited

UNITED STATES PATENTS

| | | | |
|---|---|---|---|
| 3,047,780 | 7/1962 | Metz | 317—234 |
| 3,078,409 | 2/1963 | Bertsche et al. | 310—68.4 X |
| 3,160,771 | 12/1964 | Martin et al. | 310—68 |
| 3,183,407 | 5/1965 | Yasuda et al. | 317—235 |
| 3,231,794 | 1/1966 | Diebold | 321—27 X |
| 3,295,046 | 12/1966 | Margaira | 310—68 X |
| 3,356,914 | 12/1967 | Whigham et al. | 317—234 |

MILTON O. HIRSHFIELD, Primary Examiner

M. O. BUDD, Assistant Examiner

U.S. Cl. X.R.

310—71